United States Patent
Steinborn et al.

(10) Patent No.: US 8,037,776 B2
(45) Date of Patent: Oct. 18, 2011

(54) GEAR BRAKE DEVICE FOR A MULTI-SPEED MANUAL TRANSMISSION

(75) Inventors: Mario Steinborn, Friedrichshafen (DE); Ramon Cordt, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 1021 days.

(21) Appl. No.: 11/874,401

(22) Filed: Oct. 18, 2007

(65) Prior Publication Data

US 2008/0092676 A1    Apr. 24, 2008

(30) Foreign Application Priority Data

Oct. 24, 2006 (DE) .......... 10 2006 050 009

(51) Int. Cl.
*F16H 63/50* (2006.01)
*B60K 17/28* (2006.01)
(52) U.S. Cl. .......................... 74/11; 74/15.66
(58) Field of Classification Search .......... 384/11, 384/15.4, 15.6, 15.66, 15.69, 15.88
See application file for complete search history.

(56) References Cited

U.S. PATENT DOCUMENTS

| | | | |
|---|---|---|---|
| 3,046,813 A * | 7/1962 | Bixby | 74/15.66 |
| 6,003,391 A | 12/1999 | Kojima et al. | |
| 6,080,081 A | 6/2000 | Sauermann et al. | |
| 2005/0241423 A1 | 11/2005 | Muetzel et al. | |
| 2006/0116238 A1 | 6/2006 | Karlsson et al. | |
| 2008/0065300 A1 | 3/2008 | Petzold et al. | |

FOREIGN PATENT DOCUMENTS

| | | |
|---|---|---|
| CA | 1115990 | 1/1982 |
| DE | 2360804 | 11/1974 |
| DE | 26 34 057 | 2/1978 |
| DE | 3017506 | 11/1980 |
| DE | 19708929 | 9/1998 |
| DE | 698 25 374 T2 | 7/2005 |
| DE | 10 2004 045 828 A1 | 4/2006 |
| DE | 102004045828 | 4/2006 |
| DE | 10 2005 002 496 A1 | 7/2006 |
| GB | 1 550 259 | 8/1979 |
| GB | 1550259 | 8/1979 |
| JP | 2005313739 | 11/2005 |

* cited by examiner

*Primary Examiner* — William C Joyce
(74) *Attorney, Agent, or Firm* — Davis & Bujold, P.L.L.C.

(57) ABSTRACT

The invention relates to a gear brake device for a multi-speed manual transmission (2), comprising a gear brake (16) that is arranged outside the transmission housing, that is led out of the transmission housing, and which has a power take-off shaft that is drive-connected or can be drive-connected with an input side gear shaft arrangement, said gear brake performing a synchronization function during up-shifting of the transmission in the known manner. According to the present invention, at least one PTO connection (20) with a drive connection to the power take-off shaft (12) is arranged downstream of the gear brake (16), so that the power take-off shaft (12) is also available for a PTO function.

14 Claims, 1 Drawing Sheet

GEAR BRAKE DEVICE FOR A MULTI-SPEED MANUAL TRANSMISSION

This application claims priority from German Application Serial No. 10 2006 050 009.1 filed Oct. 24, 2006.

FIELD OF THE INVENTION

The invention relates to a gear brake device for a multi-speed manual transmission.

BACKGROUND OF THE INVENTION

Modern manual transmissions are generally constructed in such a way that a plurality of gear wheels, which are fixedly arranged on a drive shaft, continuously engage with freely rotatable gear wheels that are respectively assigned to them and are arranged on a second drive shaft. In order to engage a gear, one of the idlers is rotationally coupled with the assigned drive shaft so that the drive torque of the first drive shaft is transferred to the second drive shaft and from there, ultimately, to a transmission output shaft.

In order to have shock-free, noiseless and low-wear shifting when engaging a gear, it must be ensured that the idler to be coupled and the assigned transmission shaft have at least approximately the same speed. For this kind of speed synchronization, small dimension friction couplings can be used inside the transmission which, before engaging, frictionally mesh by positive locking coupling devices, thus adjusting the two different speeds to each other.

In another synchronization process, the input side drive shaft, which carries either the fixed wheels or the idlers, is brought to a speed, either through acceleration, by way of the drive engine, or by braking, using a gear brake, such that the speeds of the idler to be coupled and assigned gear shaft are essentially equal so that in this way synchronization is possible without friction couplings.

By definition, in the present invention, the gear shafts that can be connected to the drive engine of a motor vehicle via the input clutch, or the drive clutch, are subsumed under the terms "input side gear shaft assembly," while the shafts that are permanently connected to the drive gears are designated as "output side shafts".

As is generally known, in order to shift into a lower gear, the input side gear shaft assembly must be brought to a higher rotational speed. This is achieved in that after disengaging the previous gear, the starting clutch is engaged and the engine speed is increased, via an engine control unit, until the speed required for engaging the positive-locking clutch is reached. In order to up-shift, the speed of the input side gear shaft assembly must be reduced. This is achieved in that after disengaging the previous gear, the input side gear shaft arrangement is braked using a gear brake that interacts with one of the gear shafts, until the speed required for engaging the clutch is reached.

Synchronization, by way of the drive engine or a gear brake, is applicable in a simple way particularly to automatic transmissions, which already have an engine control and a transmission control. However, the functional principle can also be applied to manual-shift transmissions.

Conventional manual transmissions comprise an input shaft that is connected to the drive engine, via a drive clutch; a countershaft that is connected to it, via a fixed gear wheel connection, which carries a plurality of fixed gears; a drive-coupled output shaft that is permanently connected with the drive wheels of the vehicle. The idlers assigned to the fixed gear wheels being arranged on the output shaft and are individually connectable in a rotationally fixed manner with the output shaft in the way described above. In addition, manual transmissions with two countershafts are also known, which allow a particularly short manual transmission design. According to the definition shown above, the input shaft and the countershaft or the countershafts, form the input side gear shaft arrangement, with which the gear brake interacts. The present invention is exemplified on the basis of this type of manual transmission where, however, it should be pointed out, that the invention is applicable analogously to other transmission designs.

DE 10 2004 045 828 A1 already describes a manual transmission in which the gear brake is configured as an internal brake, which is arranged inside the transmission housing and interacts with a countershaft. The same document also mentions that the gear brake is "arranged immediately adjacent to the transmission", and that it can be executed as an external brake. It has also been proposed that an external gear brake be allowed to interact with a PTO shaft (PTO=Power Take-Off) originating at the transmission housing and being drive-connected with a countershaft. The power take-off shaft is provided for driving an auxiliary device or an attached device, for example the hydraulic pump for supplying hydraulic implements. In that type of arrangement, however, the PTO output is no longer available for the actual PTO function.

Against this background, the task of the present invention is to provide a gear braking device with which, despite a gear brake being assigned to a power take-off shaft, a PTO function of the power take-off shaft is possible for driving devices external to the transmission.

SUMMARY OF THE INVENTION

The present invention is based on the knowledge that it should be possible to divide a power take-off shaft into branches using transmission means that interact with a gear brake and into other branches that serve as PTO connections so that a synchronization function and a PTO function are possible via the same power take-off shaft.

The present invention is therefore based on a gear brake device for a multi-speed manual transmission that comprises a gear brake, which is arranged outside a transmission housing, interacts with a power take-off shift that extends from the transmission housing and is drive-connected to an input side gear shaft arrangement or can be drive-connected to the arrangement. In order to solve the task, it is provided that at least one drive-connected PTO connection to the power take-off shaft is arranged downstream of the gear brake.

According to a preferred embodiment of the present invention, the power take-off shaft branches out into at least two single shafts, one of these single shafts interacts with the gear brake and the other single shaft is provided with a PTO connection respectively.

According to a preferred embodiment of the present invention, the power take-off branches into at least two single shafts, however one of these single shafts interacts with both the gear brake and the single shaft with a PTO connection.

A constructive solution to the above mentioned embodiment provides that the power take-off shaft drives an auxiliary shaft, via a gear mechanism, the power take-off shaft and the auxiliary shaft respectively forming one of the single shafts.

According to variation of the embodiment, the power take-off shaft features a PTO connection on an end facing away from the transmission, while the auxiliary shaft interacts with the gear brake.

Another variation of the embodiment provides that the power take-off shaft interacts with the gear brake and the auxiliary shaft has a PTO connection on one end.

The disclosed gear mechanism makes possible a speed increase or gear reduction, such that the auxiliary shaft is driven at a speed that is particularly favorable for its intended use. The present invention provides that the speed of the auxiliary shaft is transformed into a higher rotational speed via the gear mechanism. Thus, the torque transmitted by the auxiliary shaft is reduced in relation to the transmission ratio so that if the auxiliary shaft interacts with the gear brake, the gear brake can be correspondingly small and compact. If the auxiliary shaft features a PTO connection, for example, for driving a hydraulic pump, a relatively small, rapidly rotating hydraulic pump requiring relatively little installation space can be connected for the specified pumping capacity.

If a PTO application is not required, a further embodiment of the present invention provides that the power take-off can be optionally connected to or disconnected from the input side gear shaft arrangement so that the power take-off shaft is not constantly driven. However, in order to still retain the synchronization function, it is then provided that the manual transmission has an additional gear brake that permanently acts on a gear shaft coupled to the gear shaft arrangement; the gear brake potentially taking over this function.

According to a constructive embodiment of the gear brake device, according to the present invention, the external gear brake is configured as a multi-disc brake with brake discs that are arranged on the assigned shaft and in a brake housing accommodating the gear brake.

BRIEF DESCRIPTION OF THE DRAWINGS

The invention will now be described, by way of example, with reference to the accompanying drawings in which.

DETAILED DESCRIPTION OF THE INVENTION

Figure 1:
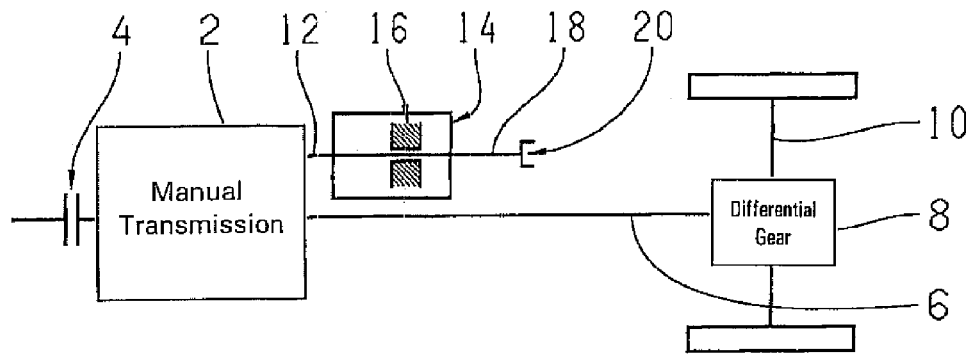
FIG. 1 is a schematic view of a drivetrain of a motor vehicle with a gear brake device.

FIG. 1 thus shows a drivetrain for a motor vehicle with a multi-speed automated manual transmission 2, which can be connected to a drive engine (not shown) by way of a drive clutch 4. An output shaft 6 of the manual transmission 2, or a cardan shaft is connected via a differential gear 8 to a driving axle 10 of the motor vehicle.

A power take-off shaft 12 is drivingly connected to an input side drive shaft arrangement of the manual transmission 2, extends into a brake housing 14 and rotates therein. The power take-off shaft 12 is assigned to a gear brake 16, which is designed as a multi-disc brake and can be controlled via a transmission control.

When, for example, during up-shifting of the manual transmission 2 with the drive clutch 4 disengaged, the input side gear shaft arrangement brakes and thus has to be synchronized with the speed of the output shaft 6, which is determined by the driving speed of the motor vehicle, or with the speed of a gear shaft that is drivingly-connected with the output shaft, the gear brake 16 is actuated, braking the power take-off shaft 12 and thus braking the input side gear shaft arrangement, which is drivingly-connected with the power take-off shaft.

As FIG. 1 shows, the power take-off shaft 12 extends through the brake housing 14 so that its end 18, facing away from the transmission, protrudes from the brake housing 14. On the end 18 of the power take-off shaft 12 that is facing away from the transmission, a PTO connection 20 is arranged or configured to which an auxiliary device or attached device, which need not be shown in detail, can be coupled.

Figure 2:
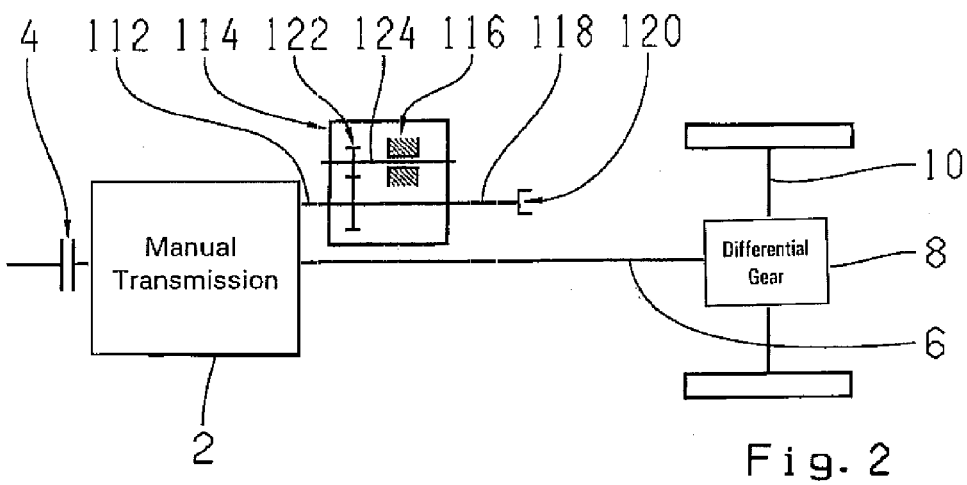
FIG. 2 is an arrangement, according to FIG. 1, with a constructive variation of the gear brake device.

FIG. 2 shows a drive arrangement, similar to that in FIG. 1, with some elements of FIG. 2 having the same reference numerals as the same components in FIG. 1, and which do not need to be explained in detail again.

As in the drive arrangement according to FIG. 1, a power take-off shaft 112 extends through a brake housing in FIG. 2 as well, and an end 118 of the power take-off shaft 112 facing away from the transmission is provided with a PTO connection 120. However, the power take-off shaft 112 branches out via a gear mechanism 122 into an auxiliary shaft 124, which also rotates in a brake housing 114. A gear brake 116 acts on the auxiliary shaft 124. As in the variation according to FIG. 1, the gear is intended for braking the input side gear shaft arrangement of the manual transmission 2 during up-shifting.

In FIGS. 1 and 2, the power take-off shafts 12, 112, respectively, are firmly drive-connected with the input side gear shaft arrangement so that the power take-off shafts 12, 112 constantly rotate at a speed corresponding to that of the input side gear shaft assembly.

Figure 3:
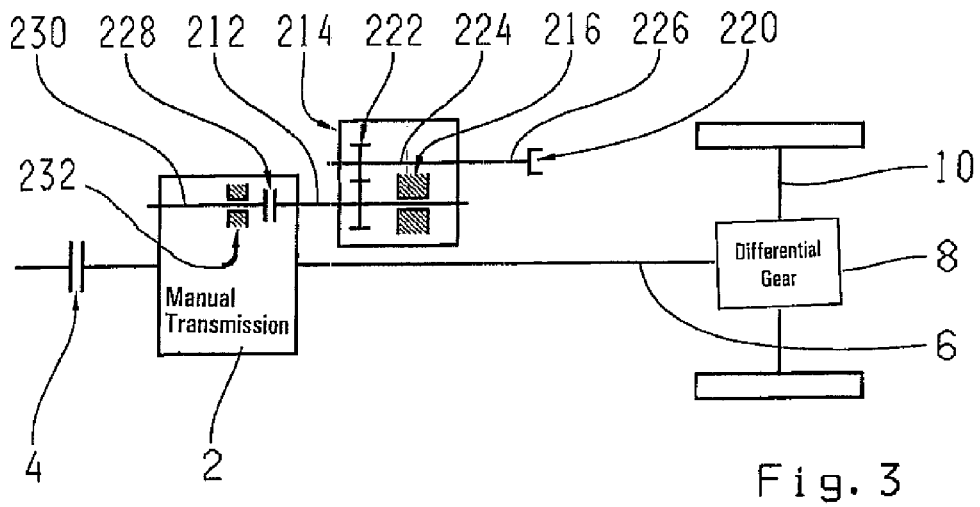
FIG. 3 is an arrangement, according to FIGS. 1 and 2, with a further variation of the arrangement of a gear brake device.

FIG. 3 shows a drive arrangement in which the same reference numerals for the same elements as in FIGS. 1 and 2 are used in part. As FIG. 3 show, a power take-off shaft 212 also branches out via a gear mechanism 222 into an auxiliary shaft 224. Unlike the arrangement according to FIG. 2, in the variation according to FIG. 3, a gear brake 216 acts together with the power take-off shaft 212, while the auxiliary shaft 224 extends out of a brake housing 214 and is provided on an emerging end 226 with a PTO connection 220.

As further shown in FIG. 3, the power take-off shaft 212 can be connected on its transmission end, via a power take-off clutch 228, with a gear shaft 230 that is drivingly-connected to the input side gear shaft arrangement or can be connected with the arrangement. Thus, the PTO connection 220 can be shut down if it is not in use. In order to still have a gear brake for the synchronization function, an additional, preferably a smaller and less powerful gear brake 232, which takes over the synchronization function of the transmission 2 if the power take-off shaft clutch 228 is disengaged, is assigned to the gear shaft 230.

REFERENCE NUMERALS 2 manual transmission
4 drive clutch
6 output shaft
8 differential gear
10 driving axle
12 power take-off shaft
14 brake housing
16 gear brake
18 end of the power take-off shaft farther away from the transmission
20 PTO connection
112 power take-off shaft
114 brake housing
116 gear brake
118 end of the power take-off shaft facing away from the transmission
120 PTO connection
122 gear mechanism 124 auxiliary shaft
212 power take-off shaft
214 brake housing
216 gear brake
220 PTO connection
222 gear mechanism
224 auxiliary shaft
226 end of the power take-off shaft facing away from the transmission
228 power take-off shaft clutch
230 gear shaft
232 gear brake

The invention claimed is:

1. A gear braking device for a multi-speed manual transmission (2), the gear braking device comprising a gear brake that is located outside a transmission housing and engagable with a power take-off shaft (12, 112, 212) that extends out of the transmission housing and is drivingly connectable with an input-side gear shaft arrangement such that the input-side gear shaft arrangement is braked by the gear brake, via the power take-off shaft (12, 112, 212), at least one power take-off connection (20, 120, 220) being located downstream a gear mechanism (122, 222) and the at least one power take-off connection (20, 120, 220) being drivingly connected with the power take-off shaft (12, 112, 212), the gear brake braking and synchronizing rotation of the input-side gear shaft arrangement with rotation of a drive output shaft (6) during an upshift of the transmission (2) when a driving clutch is disengaged;
the at least one power take-off shaft (112, 212) branches out into an auxiliary shaft (124, 224) which interacts with the gear brake (116, 216) and the at least one power take-off shaft (112, 212) comprises the at least one power take-off connection (120, 220); and
the at least one power take-off shaft (112, 212) drives, via the gear mechanism (122, 222), the auxiliary shaft (124, 224).

2. The gear brake device according to claim 1, wherein the at least one power take-off shaft (112) has the power take-off connection (120) on an end (118) farther away from the transmission.

3. The gear brake device according to claim 2, wherein the gear mechanism (122, 222) transforms a rotational speed of the auxiliary shaft (124, 224) into a higher rotational speed.

4. The gear brake device according to claim 1, wherein the at least one power take-off shaft (212) is connectable with an input side gear shaft arrangement (gear shaft 230), and the manual transmission (2) has an additional gear brake (232) that interacts with a gear shaft that is permanently coupled to the input side gear shaft arrangement.

5. The gear brake device according to claim 1, wherein the gear brake (16, 116, 216) is arranged on the auxiliary shaft (124, 224) and in a brake housing (14) that accommodates the gear brake (16, 116, 216).

6. The gear brake device according to claim 1, wherein the gear brake housing (14, 114, 214) comprises only one drive input and only one drive output.

7. A gear braking device for a multi-speed manual transmission (2), the transmission (2) having a transmission housing which houses a gear shaft arrangement which is connectable to and driven by a drive engine, via a drive clutch (4), and a transmission output shaft (6) is drivingly connected with the gear shaft arrangement within the transmission housing, the gear braking device comprising:
a power take-off shaft (12, 112, 212) being drivingly connected to the gear shaft arrangement within the transmission housing, and the power take-off shaft (12, 112, 212) extends through the transmission housing to an exterior thereof;
a gear brake (16, 116, 216), which is located exterior of the transmission housing, being engagable with an auxiliary shaft (124) and with the power take-off shaft (12, 112, 212) via a gear arrangement (122) such that the gear shaft arrangement is braked by the gear brake to synchronize rotation of the gear shaft arrangement with rotation of the drive output shaft (6) during an upshift of the transmission (2) when the driving clutch (4) is disengaged; and
a power take-off connection (20, 120, 220) communicating with and being driven by the power take-off shaft (12, 112, 212).

8. The gear brake device according to claim 7, wherein the power take-off shaft (112, 212) drives, via the gear arrangement (122, 222), the auxiliary shaft (124, 224).

9. The gear brake device according to claim 8, wherein the power take-off connection (120) is located on an end of the power take-off shaft (112) that is located furthest away from the manual transmission (2), and the auxiliary shaft (124) is engagable with the gear brake (116).

10. The gear brake device according to claim 9, wherein rotation of the power take-off shaft (112, 212) is transferred, via the gear mechanism (122, 222), to the auxiliary shaft (124, 224) such that a rotational speed of the auxiliary shaft (124, 224) is greater than a rotational speed of the power take-off shaft (112, 212).

11. The gear brake device according to claim 8, wherein the power take-off connection (220) is located on an end of the auxiliary shaft (224), and the power take-off shaft (212) is engagable with the gear brake (216).

12. The gear brake device according to claim 7, wherein the gear shaft arrangement includes a gear shaft (230) that is engageable with the power take-off shaft (112, 212), and an additional gear brake (232) is located within the manual transmission (2) and is engagable with the gear shaft (230).

13. The gear brake device according to claim 7, wherein the gear brake (16, 116, 216) is coupled to the auxiliary shaft and is located within in a brake housing (14, 114, 214).

14. The gear brake device according to claim 7, wherein the gear brake housing (14, 114, 214) comprises only one drive input and only one drive output.

* * * * *